(12) United States Patent
Kim

(10) Patent No.: US 11,159,026 B2
(45) Date of Patent: Oct. 26, 2021

(54) SUB BATTERY

(71) Applicant: Samsung Electronics Co., Ltd, Suwon-si (KR)

(72) Inventor: Jin Wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 16/215,146

(22) Filed: Dec. 10, 2018

(65) Prior Publication Data
US 2019/0190292 A1    Jun. 20, 2019

(30) Foreign Application Priority Data
Dec. 19, 2017    (KR) ........................ 10-2017-0175318

(51) Int. Cl.
| | | |
|---|---|---|
| H02J 7/00 | (2006.01) | |
| H01M 10/46 | (2006.01) | |
| H01M 50/209 | (2021.01) | |
| H01M 50/103 | (2021.01) | |
| H01M 50/256 | (2021.01) | |
| H01M 10/02 | (2006.01) | |
| H01M 50/543 | (2021.01) | |

(Continued)

(52) U.S. Cl.
CPC ............. *H02J 7/00* (2013.01); *H01M 10/46* (2013.01); *H01M 50/103* (2021.01); *H01M 50/209* (2021.01); *H01M 50/256* (2021.01); *H02J 7/0045* (2013.01); *F21L 4/00* (2013.01); *F21L 13/00* (2013.01); *H01M 10/02* (2013.01); *H01M 50/543* (2021.01); *H04B 1/38* (2013.01); *H04M 1/00* (2013.01)

(58) Field of Classification Search
CPC .......... H02J 7/00; H02J 7/0045; H01M 10/46; H01M 10/02; H01M 50/103; H01M 50/209; H01M 50/256; H01M 2/00; F21L 4/00; F21L 13/00; H04B 1/38; H04M 1/00

USPC ................. 320/107, 110, 112, 115; 362/183; 429/97, 100; 455/573

See application file for complete search history.

(56) References Cited

U.S. PATENT DOCUMENTS

| | | |
|---|---|---|
| 3,770,511 A | 11/1973 | Winterbottom et al. |
| 9,733,480 B2 | 8/2017 | Baek et al. |

(Continued)

FOREIGN PATENT DOCUMENTS

| | | |
|---|---|---|
| CN | 206478480 U | 9/2017 |
| JP | 2016182200 A | 10/2016 |

OTHER PUBLICATIONS

Communication pursuant to Article 94(3) EPC dated Oct. 15, 2020 in connection with European Patent Application No. 18 212 774.6, 6 pages.

(Continued)

*Primary Examiner* — Phallaka Kiki

(57) ABSTRACT

A sub battery for easily charging includes: a battery body including a first surface facing toward a first direction and a second surface facing toward a second direction opposite the first direction, and an opening formed on at least a portion between the first and second surfaces; a holder having a charging connector cable attachably and detachably fixed thereto, and movably disposed in the opening; and a locking device mounted between the holder and the battery body to fix the holder to the battery body in a closed state, and to unlock the holder according to a movement of the holder by a first distance.

16 Claims, 29 Drawing Sheets

(51) Int. Cl.
  *F21L 13/00* (2006.01)
  *F21L 4/00* (2006.01)
  *H04M 1/00* (2006.01)
  *H04B 1/38* (2015.01)

(56) References Cited

U.S. PATENT DOCUMENTS

| | | | |
|---|---|---|---|
| 2011/0139521 A1* | 6/2011 | Ichikawa | B65H 75/425 |
| | | | 180/65.1 |
| 2013/0043826 A1 | 2/2013 | Workman et al. | |
| 2014/0176070 A1* | 6/2014 | Krammer | B60L 53/66 |
| | | | 320/109 |
| 2014/0311849 A1* | 10/2014 | Iwami | H02G 11/02 |
| | | | 191/12.4 |
| 2016/0276818 A1* | 9/2016 | Aoki | B60R 16/0238 |
| 2017/0249271 A1 | 8/2017 | Gagne-Keats et al. | |
| 2020/0284423 A1* | 9/2020 | Chien | F21V 33/0004 |
| 2021/0002170 A1* | 1/2021 | Chien | C03C 27/02 |

OTHER PUBLICATIONS

Office Action dated Nov. 16, 2020 in connection with India Patent Application No. 201824047382, 6 pages.
European Patent Office, "European Search Report," Application No. EP18212774.6, dated Mar. 25, 2019, 9 pages.

\* cited by examiner

SUB BATTERY

CROSS-REFERENCE TO RELATED APPLICATIONS

This application is based on and claims priority under 35 U.S.C. § 119 to Korean Patent Application No. 10-2017-0175318 filed on Dec. 19, 2017, in the Korean Intellectual Property Office, the disclosure of which is incorporated by reference herein in its entirety.

BACKGROUND

1. Field

Various embodiments of the present disclosure relate to a portable sub battery of an electronic device.

2. Description of Related Art

In general, users may carry sub batteries to charge electronic devices such as smart phones, and in particular, users using battery-integrated smartphones often carry sub batteries.

Such portable sub batteries are divided into various types of batteries. For example, there is a sub battery having a universal serial bus (USB) charging connector cable integrated into a battery body, or removed therefrom to be used.

The above information is presented as background information only to assist with an understanding of the present disclosure. No determination has been made, and no assertion is made, as to whether any of the above might be applicable as prior art with regard to the present disclosure.

SUMMARY

However, when a USB charging connector is integrated into a battery body, there is a problem of disconnection of a USB charging connector cable, and in particular, the USB charging connector may be damaged when the sub battery is dropped down.

In addition, when a USB charging connector cable is configured to be removable from a battery body, that is, is a product that can be separately purchased, there is inconvenience that a user should always carry the USB charging connector cable, and also, there is a risk of losing.

Various embodiments of the present disclosure provide a sub battery which reduces a risk of disconnecting a charging cable.

Various embodiments of the present disclosure provide a sub battery which has a USB charging connector cable configured to be removable from a battery body, but couplable to a holder, and thus reduces a risk of losing the USB charging connector cable.

Various embodiments of the present disclosure provide a sub battery with a USB charging connector cable that can be separately purchased.

Various embodiments of the present disclosure provide a sub battery which can use a USB charging connector cable as a strap, and is easy to carry.

According to various embodiments of the present disclosure, a sub battery includes: a battery body including a first surface facing toward a first direction and a second surface facing toward a second direction opposite the first direction, and an opening formed on at least a portion between the first and second surfaces; a holder having a charging connector cable attachably and detachably fixed thereto, and movably disposed in the opening; and a locking device mounted between the holder and the battery body to fix the holder to the battery body in a closed state, and to unlock the holder according to a movement of the holder by a first distance.

According to various embodiments of the present disclosure, a sub battery includes: a battery body including an opening; and a holder having a support structure to allow a charging connector cable to be mounted therein and dismounted therefrom, the holder arranged to be movable in the opening, the holder sliding by a first distance in a direction further away from the battery body to be unlocked, and sliding by a second distance in the direction further away from the battery body to allow at least one charging connector to be exposed through the opening, the holder being rotated after the sliding movement by the second distance, thereby making the at least one charging connector drawable out from the battery body.

According to various embodiments of the present disclosure, the sub battery can reduce risks of disconnecting a USB charging cable and losing. In particular, the sub battery according to various embodiments of the present disclosure can be separately purchased, and can be used as a strap and thus is easy to carry. Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10A is a view illustrating the first and second charging connectors mounted in the holder, FIG. 10B is a view illustrating the first charging connector drawn out from the battery body, and FIG. 10C is a view illustrating the first charging connector drawn out from the battery body, before charging an electronic device (not shown);

FIG. 11A is a view illustrating the first and second charging connectors mounted in the holder, FIG. 11B is a view illustrating the second charging connector connected to the battery body, and FIG. 11C is a view illustrating the second charging connector connected to the battery body and the first charging connector drawn out from the battery body;

DETAILED DESCRIPTION

Figure 1:
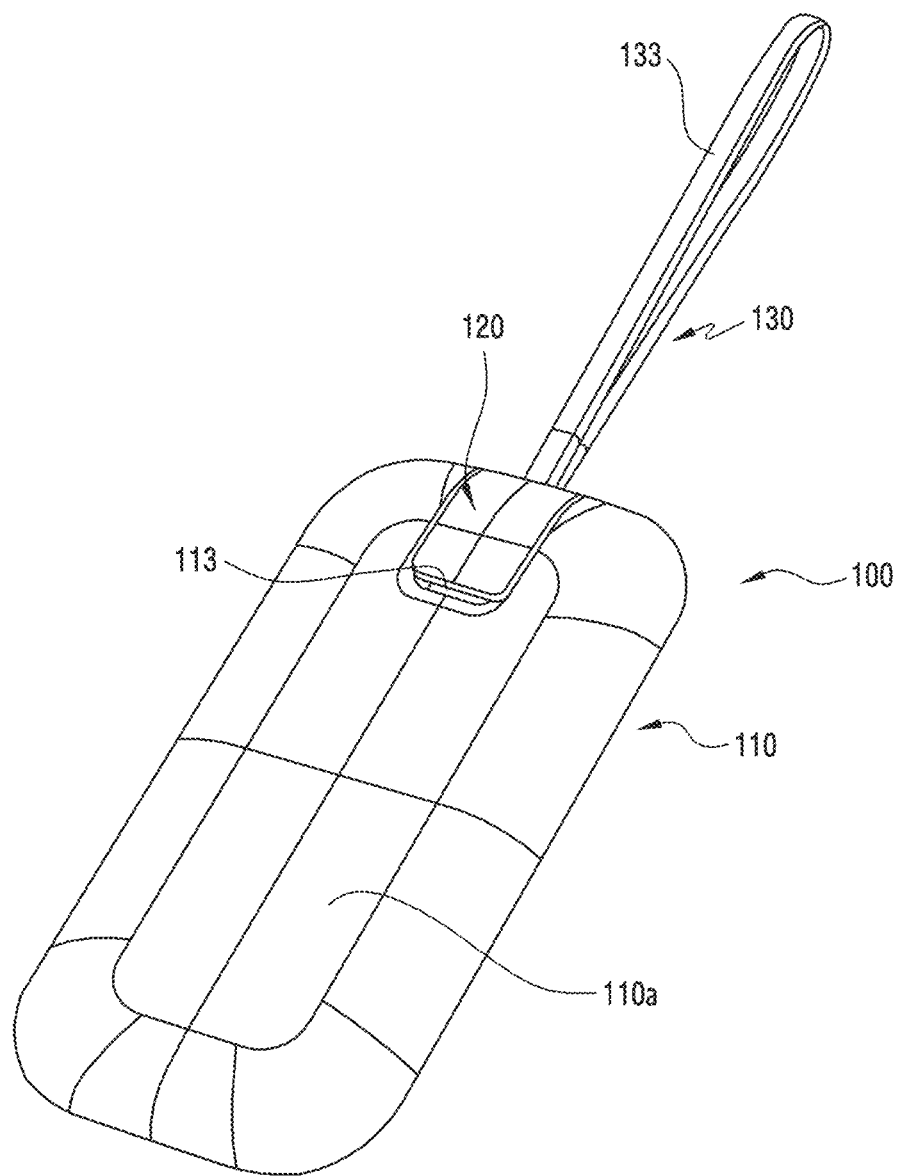
FIG. 1 is a perspective view illustrating a sub battery when a holder is closed according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described with reference to accompanying drawings. However, various embodiments of the present disclosure are not limited to specific embodiments, and it should be understood that modification, equivalent, and/or alternative on the various embodiments described herein can be variously made. With regard to description of drawings, similar components may be marked by similar reference numerals.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein, may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices regardless of the order or priority. For example, without departing from the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present disclosure are used to describe specified embodiments of the present disclosure and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (for example, smart glasses, head-mounted-devices (HMDs), electronic apparels, electronic bracelets, electronic necklaces, electronic appcessory, electronic tattoos, smart mirrors, or smart watches).

According to certain embodiments, the electronic devices may be smart home appliances. The smart home appliances may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™ Apple TV™, or Google TV™), game consoles (for example, Xbox™ and PlayStation™) electronic dictionaries, electronic keys, camcorders, electronic picture frames, and the like.

According to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation electronic devices, global positioning system receivers (GPSs), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or internet of things (for example, light bulbs, various sensors, electric or gas meters, sprinkler devices, fire alarms, thermostats, street lamps, toasters, exercise equipment, hot water tanks, heaters, boilers, and the like).

According to a certain embodiment, the electronic devices may include at least one of a part of furniture or buildings/structures, electronic boards, electronic signature receiving devices, projectors, or various measuring instruments (for example, water meters, electricity meters, gas meters, or wave meters, and the like). The electronic devices according to various embodiments may be one or more combinations of the above-mentioned devices. According to a certain embodiment, an electronic device may be a flexible electronic device. Also, electronic devices according to various embodiments of the present disclosure are not limited to the above-mentioned devices, and may include new electronic devices according to technology development.

Figure 2:
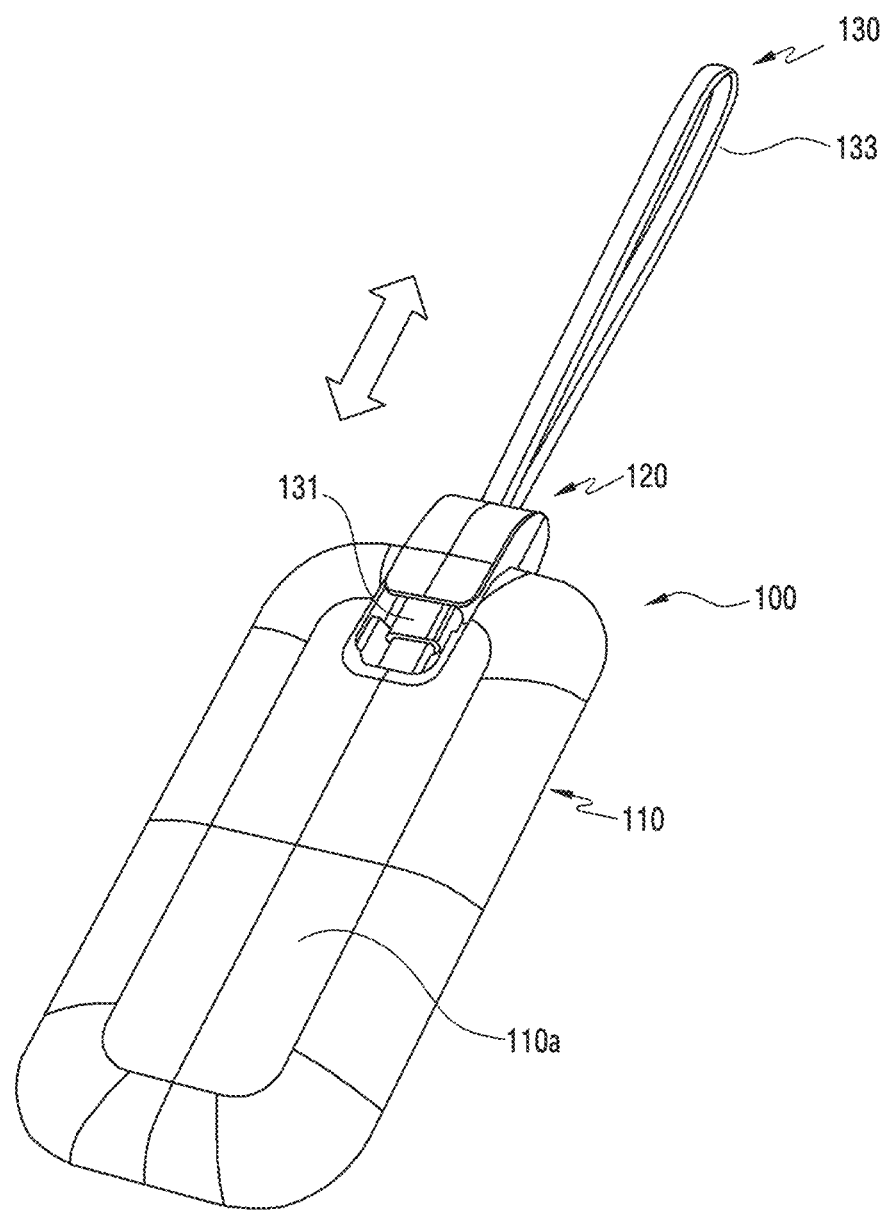
FIG. 2 is a perspective view illustrating the sub battery when the holder slides according to various embodiments of the present disclosure.
Figure 3:
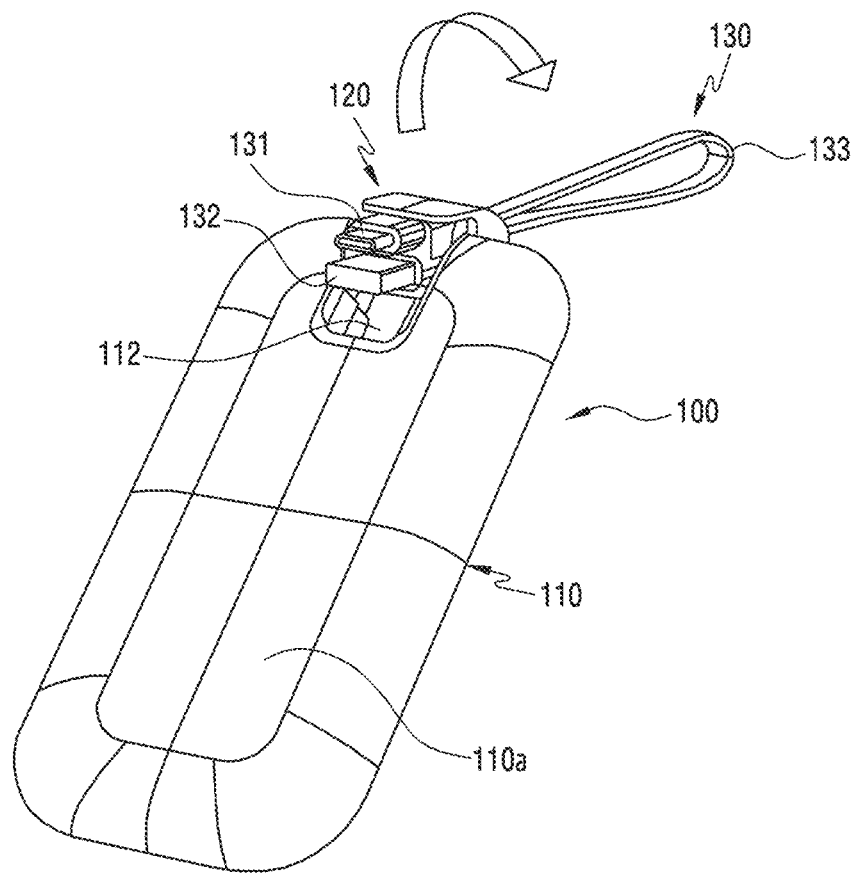
FIG. 3 is a perspective view illustrating the sub battery when the holder is rotated after sliding according to various embodiments of the present disclosure.

FIG. 1 is a perspective view illustrating a sub battery when a holder is closed according to various embodiments of the present disclosure. FIG. 2 is a perspective view illustrating the sub battery when the holder slides according to various embodiments of the present disclosure. FIG. 3 is a perspective view illustrating the sub battery when the holder is rotated after sliding according to various embodiments of the present disclosure.

Referring to FIGS. 1 to 3, the sub battery 100 according to various embodiments may be a portable, small-sized battery which is used as an auxiliary power supply device of an electronic device such as a smartphone. For example, the sub battery 100 may be used to charge a first device and may be charged by a second device. For example, the first device may be an electronic device such as a smartphone, and the second device may be a power supply device or another battery.

According to various embodiments, the sub battery 100 may include a battery body 110, a holder 120, and a charging connector cable 130.

According to various embodiments, the battery body 110 may include a first surface 110a facing toward a first direction, and a second surface (for example, 310b) facing toward a second direction opposite the first direction. The first direction may be a vertical upward direction of the first surface 110a, and the second direction may be a vertical downward direction of the first surface, that is, a vertical upward direction of the second surface. For example, the first surface 110a may be a front surface, and the second surface may be a rear surface. In addition, the first surface 110a may be an upper surface, and the second surface may be a lower surface. A side surface may be provided between the first and second surfaces, or may not be provided. The side surface between the first and second surfaces may face toward a third direction which is substantially perpendicular to the first and second directions.

According to various embodiments, the battery body 110 may include an opening 112 having a volume enough to accommodate the holder 120. The opening 112 may be formed on a first position of the battery body 110, for example, on a center of an upper end, but is not limited thereto.

According to various embodiments, the opening 112 may be opened toward the first direction, the second direction, and the third direction. The holder 120 may be coupled to be movable through the opening 112 formed as described above. For example, the movement of the holder 120 may include one or more sliding movements and a forward and backward rotation movement about a rotation shaft. The holder 120 may slide in the opening 112 in a direction further away from the battery body 110.

When the holder 120 according to various embodiments is mounted in the opening 112 (as shown in FIG. 1), a cable penetrating opening 113 (shown in FIG. 1) may exist between the battery body 110 and the holder 120. For example, the cable penetrating opening 113 may be a hole in which a connection cable 133 of a charging connector 131 is positioned when one charging connector 131 is drawn out from the battery body 110.

According to various embodiments, the holder 120 may slide in the opening 112. For example, the sliding movement of the holder 120 may be linear and the holder 120 may move in the direction further away from the battery body 110. The holder 120 sliding in the opening 112 of the battery body is illustrated in FIG. 2. When the holder 120 is rotated after sliding, the first and second charging connectors 131, 132 coupled to the holder 120 may be exposed to the outside, and may be in a drawable state where the first and second charging connectors 131, 132 can be drawn out from the battery body 110 to the outside. The drawable state of the first and second charging connectors 131, 132 is illustrated in FIG. 3. When the first and second charging connectors 131, 132 are in the drawable state as shown in FIG. 3, a user may draw out one charging connector from the holder 120 and may connect the charging connector to an electronic device, and may connect the other charging connector to the battery body 110, thereby charging the electronic device by using the sub battery.

According to various embodiments, the connection cable 133 of the charging connector cable 130 may be drawn out from the holder 120 and may be used as a strap of the sub battery 100.

Figure 4:
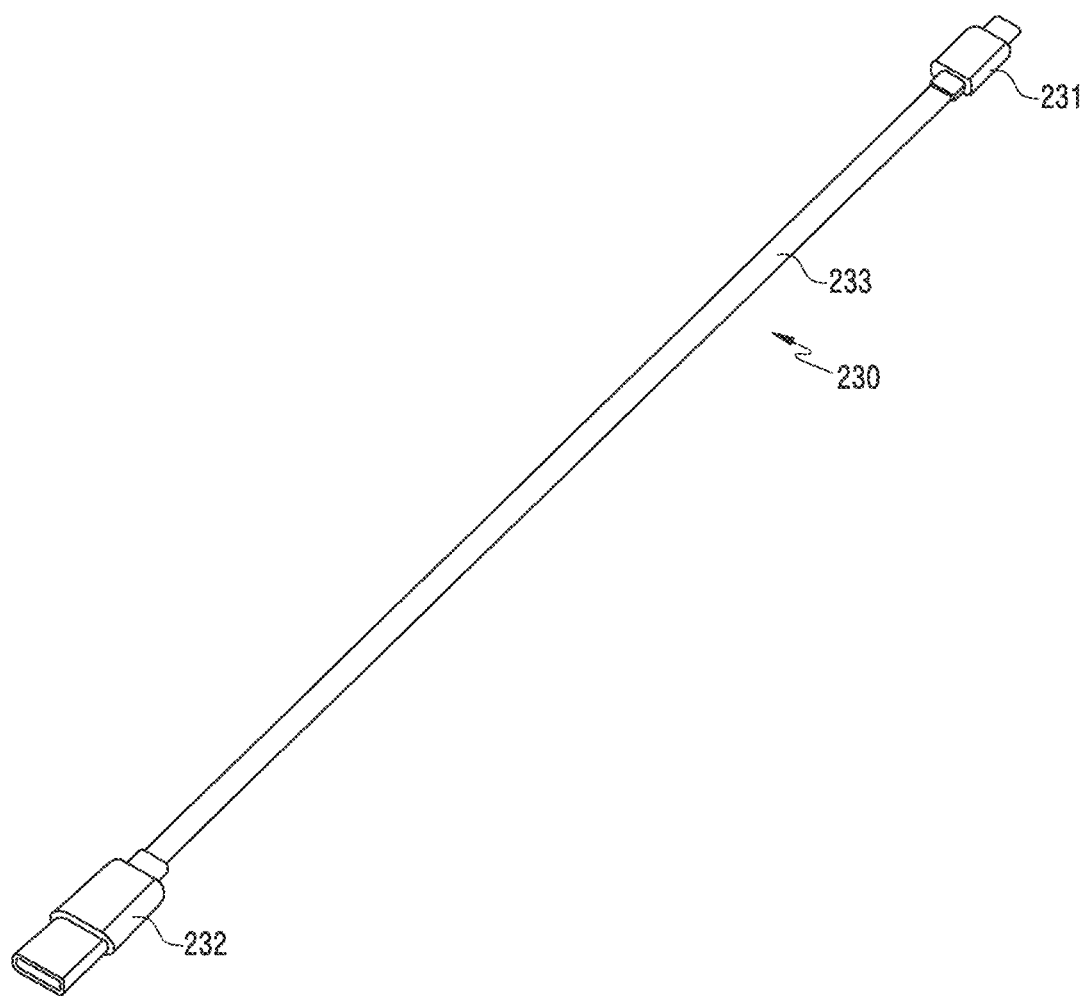
FIG. 4 is a perspective view illustrating a charging connector cable which is coupled to a holder of a sub battery according to various embodiments of the present disclosure.

FIG. 4 is a perspective view illustrating a charging connector cable to be coupled to a holder of a sub battery according to various embodiments of the present disclosure.

Referring to FIG. 4, the charging connector cable 230 according to various embodiments may have the same configuration as that of the charging connector cable 130 illustrated in FIGS. 1 to 3. According to various embodiments, the charging connector cable 230 may include a first charging connector 231, a second charging connector 232, and a connection cable 233.

According to various embodiments, the charging connector cable 230 may be a product that can be separately purchased, and may be purchased as long as desired by the user and may be used. For example, the first charging connector 231 may include a USB-C connector, and the second charging connector 232 may include a USB connector.

According to various embodiments, the first charging connector 231 may be connected to one end of the connection cable 233, and the second charging connector 232 may be connected to the other end of the connection cable 233. For example, the connection cable 233 may be 30 cm, 50 cm, or 1 m or more long. The user may selectively purchase the charging connector cable 230 as long as needed.

Figure 5A:
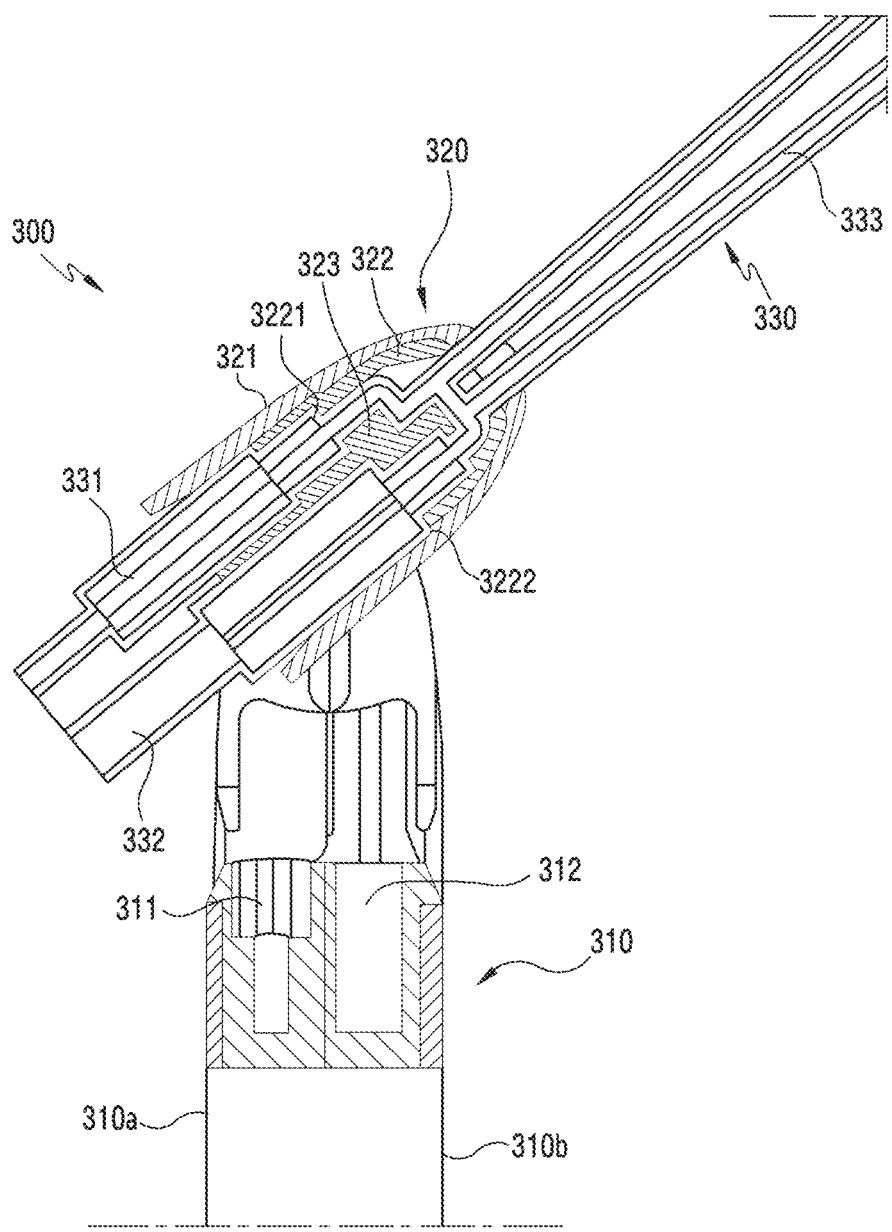
FIG. 5A is a cross-sectional view illustrating a holder of a sub battery which is rotated after sliding according to various embodiments of the present disclosure.
Figure 5B:
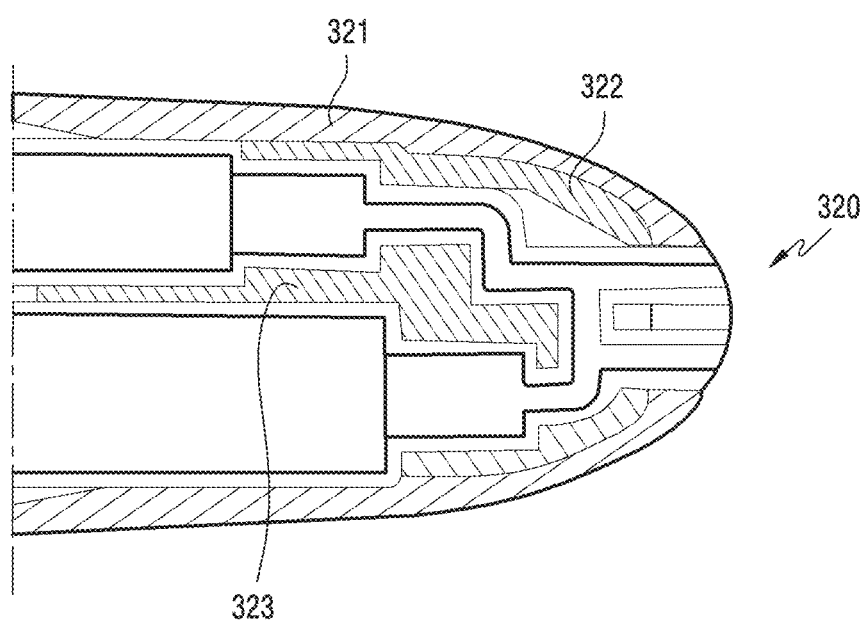
FIG. 5B is a cross-sectional view illustrating an internal holder and an external holder of the holder which are coupled to each other according to various embodiments of the present disclosure.

FIG. 5A is a cross-sectional view illustrating a holder of a sub battery which is rotated after sliding according to various embodiments of the present disclosure. FIG. 5B is a cross-sectional view illustrating an internal holder and an external holder of the holder which are coupled to each other according to various embodiments of the present disclosure.

Referring to FIGS. 5A and 5B, the holder 320 of the sub battery 300 according to various embodiments may have the same configuration as that of the holder 120 illustrated in FIGS. 1 to 3. The holder 320 according to various embodiments may include an internal holder 322 and an external holder 321. The holder 320 may be a supporting member for fixing first and second charging connectors 331, 332, and a connection cable 333. Accordingly, the holder 320 may include an injection molding structure 323 for fixing the first and second charging connectors 331, 332 and the connection cable 333.

According to various embodiments, the internal holder 322 may be coupled to the inside of the external holder 321. The internal holder 322 may be in close contact with the external holder 321. The internal holder 322 may be provided with first and second seating portions 3221, 3222 on which the first and second charging connectors 331, 332 are seated. For example, the first and second charging connectors 331, 332 may be seated on the first and second seating portions 3221, 3222, respectively, and may face each other, and may be independently separated from each other on the first and second seating portions 3221, 3222. The first seating portion 3221 may be provided with a receiving injection molding structure of a shape corresponding to an exterior of the first charging connector 331, and the second seating portion 3222 may be provided with a receiving injection molding structure of a shape corresponding to the exterior of the second charging connector 332. When the first and second charging connectors 331, 332 are seated on the first and second seating portions 3221, 3222, respectively, the first and second charging connectors 331, 332 may be moved along with the holder 320. One end of the internal holder 322 may be an opened end for allowing the first and second charging connectors 331, 332 and the connection cable 333 to be drawn in, and the other end may be an opened end for allowing the drawn-in connection cable 333 to be drawn out.

According to various embodiments, the external holder 321 may be configured to surround the internal holder 322, and may be coupled to the internal holder 322 and may be moved as an integral part. For example, the external holder 321 may be integrally coupled to the internal holder 322, and may be separated with the internal holder 322 being coupled thereto. One end of the external holder 321 may be an opened end for allowing the internal holder 322 to be drawn in, and the other end may be an opened end for allowing the drawn-in connection cable 333 to be drawn out.

When the drawn-out connection cable 333 is pulled with the internal holder 322 and the external holder 321 being coupled to each other, the internal holder 322 and the external holder 321 may be brought into close contact with each other more tightly, and may maintain the close contact state. The connection cable 333 may not be released from the holder 320 by the seating structure of the first and second charging connectors 331, 332. Accordingly, the drawn-out connection cable 333 may be used as a strap of the sub battery 300.

According to various embodiments, the battery body 310 of the sub battery 300 may include a connection structure disposed therein. The connection structure is a structure for electrically connecting the first and second charging connectors 331, 332 to the battery body 310, and may include a first connection portion 311 and a second connection portion 312. The first connection portion 311 may be an electric connection connector, for example, a connection terminal or a connection connector, for connecting the first charging connector 331 to the battery body 310. The second connection portion 312 may be an electric connection connector, for example, a connection terminal or a connection connector, for connecting the second charging connector 332 to the battery body 310.

Figure 6A:
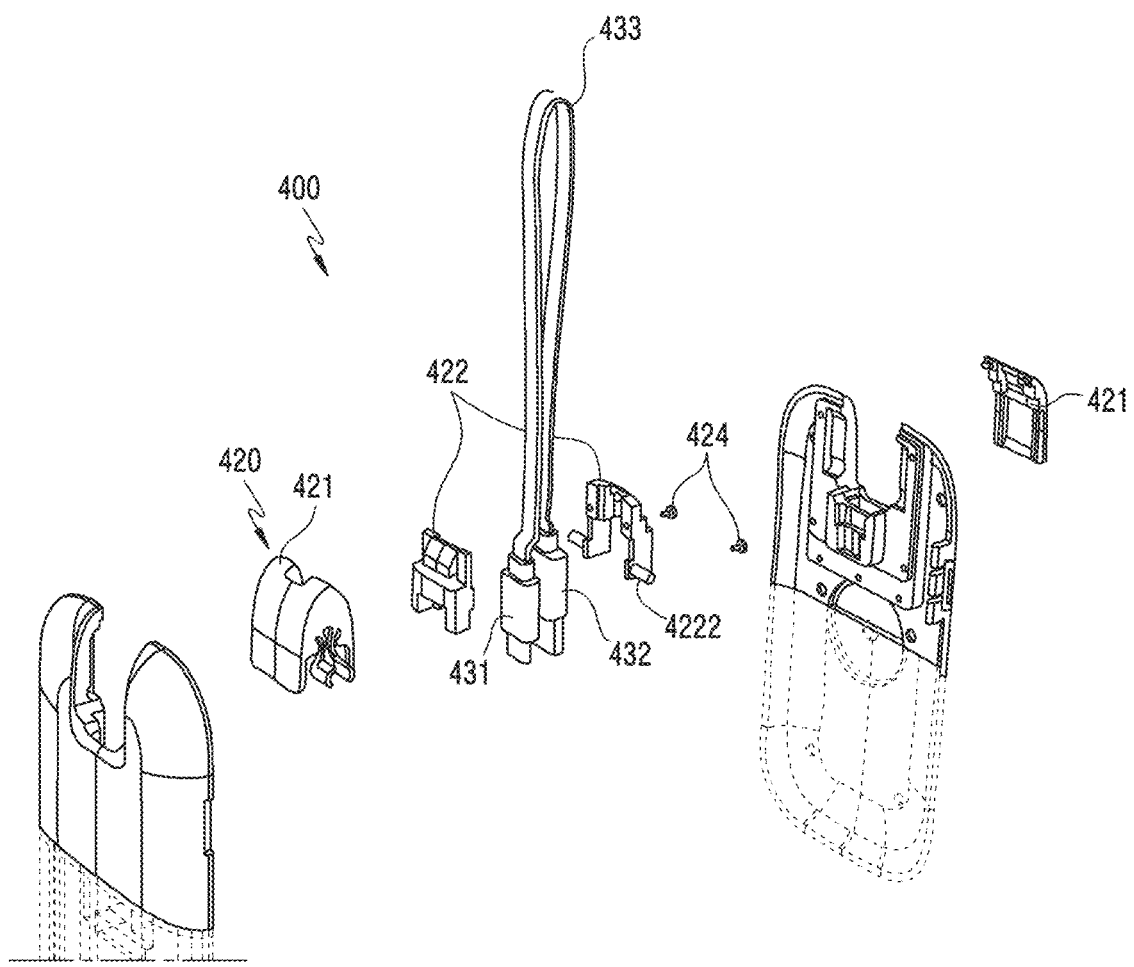
FIG. 6A is an exploded perspective view illustrating a configuration of a holder according to various embodiments of the present disclosure.
Figure 6B:
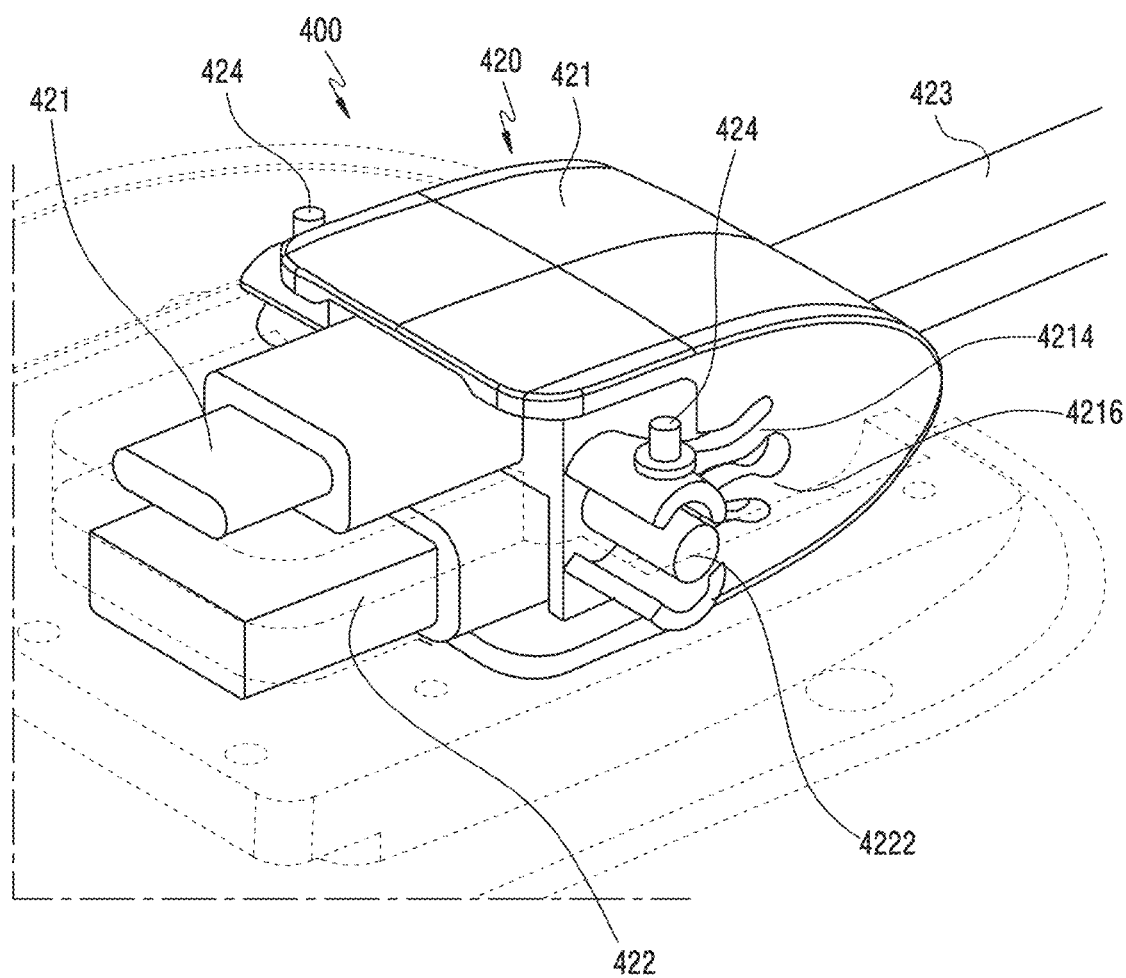
FIG. 6B is a perspective view illustrating an inside of the holder coupled to a battery body according to various embodiments of the present disclosure.
Figure 6C:
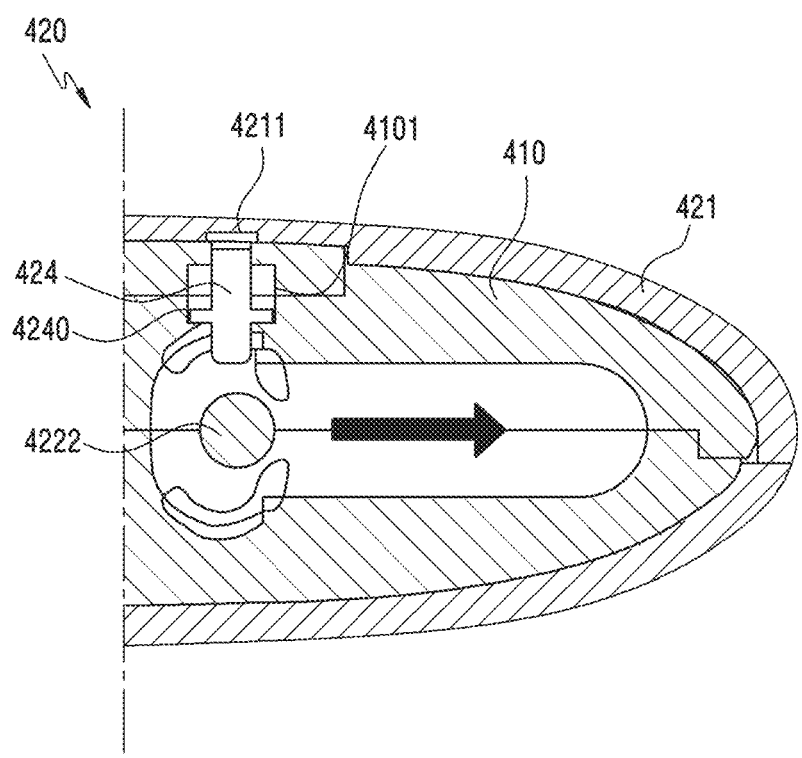
FIG. 6C is a cross-sectional view illustrating an arrangement of a movable locker according to various embodiments of the present disclosure.
Figure 6D:
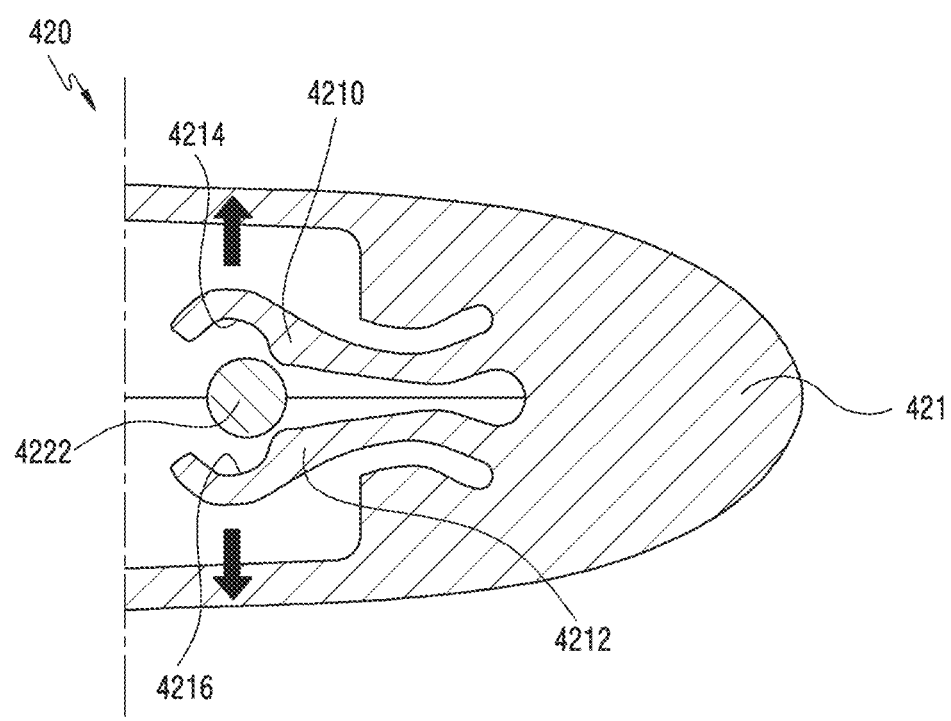
FIG. 6D is a cross-sectional view illustrating a tension portion and a sliding guide rotation shaft which interlock with each other to apply a force to the movable locker according to various embodiments of the present disclosure.
Figure 6E:
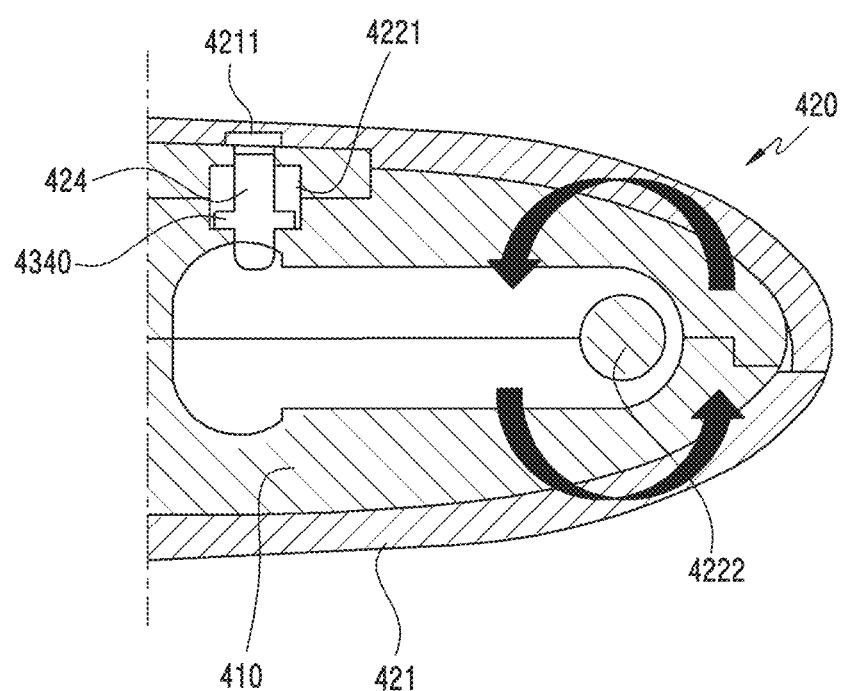
FIG. 6E is a cross-sectional view illustrating the holder which is in a slidable and rotatable state according to various embodiments of the present disclosure.
Figure 6F:
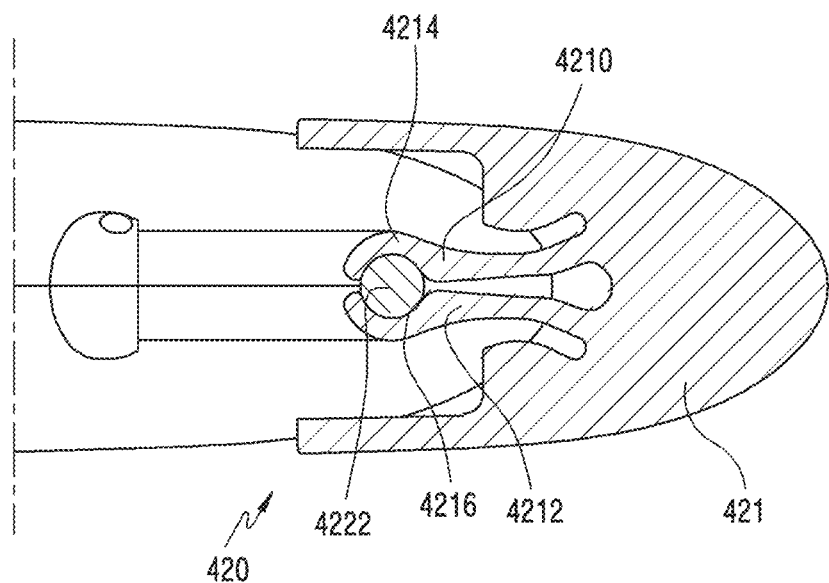
FIG. 6F is a cross-sectional view illustrating the tension portion and the sliding guide rotation shaft which are coupled to each other according to various embodiments of the present disclosure.

FIG. 6A is an exploded perspective view illustrating a configuration of a holder according to various embodiments of the present disclosure. FIG. 6B is a perspective view illustrating an inside of the holder coupled to a battery body according to various embodiments of the present disclosure. FIG. 6C is a cross-sectional view illustrating an arrangement of a movable locker according to various embodiments of the present disclosure. FIG. 6D is a cross-sectional view illustrating a tension portion and a sliding guide rotation shaft which interlock with each other to apply a force to the movable locker according to various embodiments of the present disclosure. FIG. 6E is a cross-sectional view illustrating the holder which is in a slidable and rotatable state according to various embodiments of the present disclosure. FIG. 6F is a cross-sectional view illustrating the tension portion and the sliding guide rotation shaft which are coupled to each other according to various embodiments of the present disclosure.

Referring to FIGS. 6A-6F, the holder 420 of the sub battery 400 according to various embodiments may have the same configuration as that of the holder 120 illustrated in FIGS. 1 to 3. According to various embodiments, the holder 420 may require a locking structure for preventing from being released from the battery body when the holder 420 is closed in the battery body (the holder 120 as shown in FIG. 1), and the locking structure should be unlocked by moving an external holder 421 by a first distance, and then an internal holder 422 and the external holder 421 should slide and then be rotated altogether. That is, the sub battery may require the locking structure for fixing the holder to the battery body, and a structure for unlocking the holder.

To achieve this, the holder 420 may include a first locking device for fixing the holder 420 to the battery body, and a second locking device for locking the internal holder 422 and the external holder 422 after unlocking the holder 420.

According to various embodiments, the sub battery 400 may unlock the holder 420 by moving the external holder 420 by the first distance, and may expose a first charging connector 431 and a second charging connector 432 through an opening by moving the holder 420 by a second distance, and then, may draw out the first charging connector 431 or the second charging connector 432 by rotating the holder, and may electrically connect the first charging connector 431 or the second charging connector 432 to a first connection portion (for example, the first connection portion of FIG. 5A) or a second connection portion (for example, the second connection portion of FIG. 5A) of the battery body.

According to various embodiments, the holder 420 may include a sliding guide rotation shaft 4222 (hereinafter, referred to as a shaft) for rotating after sliding in the opening of the battery body. The shaft 4222 may serve to guide the sliding movement of the holder 420, and may serve as a hinge to provide a rotational axis after the sliding movement of the holder 420.

According to various embodiments, the locking device may be a fixing device for preventing the holder 420 in the closed state from being released from the battery body, and may be a device for unlocking the holder according to the first distance sliding movement of the holder. The locking device may be disposed between the battery body and the holder, and may be provided with a movable locker 424 and may lock or unlock the holder 420 according to whether the movable locker 424 is moved or not. The locking device according to various embodiments may include the locker 424, the tension portions 4210, 4212, and the sliding guide rotation shaft 4222.

According to various embodiments, the locker 424 may serve to integrally couple the battery body 410 and the external holder 421, and the tension portions 4210, 4212 may serve to provide a force for moving the locker 424 toward the external holder 421. Such a force may be generated by the sliding guide rotation shaft and the tension portions interlocking with each other, as will be described below.

According to various embodiments, the locking device may include a moving opening 4221 formed in the battery body 410 to guide the locker 424 to move in the first direction or the second direction, a locking recess 4211 formed on the external holder 421 to allow at least part of the locker 424 to be coupled thereto, and the tension portion 4210 formed in the external holder 421 to provide a force for coupling the locker 424 to the locking recess 4211. For example, the locker 424 may be subjected to a force to be moved toward the locking recess 4211 by the tension portion 4210, but, when the force of the tension portion 4210 is not provided, the locker 424 may be moved in the second direction due to self-weight. For example, a locking protrusion 4240 may be formed on an outer circumference of the locker 424, such that the locker 424 is moved within a limit.

An upper end of the locker 424 may be inserted into the locking recess 4211, and a lower end of the locker 424 may be in contact with the tension portion 4210 and may interlock with the tension portion 4210. For example, the locker 424 may be formed by metallic material, and the upper end of the locker 424 may be formed in a curved shape.

According to various embodiments, the locking device may include the shaft 4222 and one pair of tension portions 4210, 4212. The tension portions may be arranged on both side surfaces of the external holder 421, and each tension portion may include first and second tension protrusions 4210, 4212.

According to various embodiments, the first and second tension protrusions 4210, 4212 may be integrally formed with the external holder 421 to face each other, and may be formed to protrude toward the battery body 410. The first tension protrusion 4210 may have a first coupling portion 4214 formed on an end thereof to be coupled with the shaft 4222, and the second tension protrusion 4212 may have a second coupling portion 4216 formed on an end thereof to be coupled with the shaft 4222. The first coupling portion 4214 may have a cross section formed in a substantially semicircular shape, and the second coupling portion 4216 may have a cross section formed in a substantially semicircular shape. The first and second tension protrusions 4210, 4212 may be moved in a direction further away from each other by interlocking with the shaft 4222, and this state may result in generation of a force for moving the locker 424 toward the locking recess 4211. On the other hand, the first and second tension protrusions 4210, 4212 may be moved in a direction closer to each other by the movement of the shaft 4222, and then may hold the shaft 4222 while surrounding the shaft 4222.

According to various embodiments, when the external holder 421 is moved from the internal holder 422 by the second distance, the first and second tension protrusions 4210, 4212 may be moved in the direction closer to each other by their own elastic forces, and may be coupled with the shaft 4222. The coupling state (FIG. 6F) of the shaft 4222 and the first and second tension protrusions 4210, 4212 may be referred to as a locking state of the internal and external holders 421, 422. The first and second coupling portions 4214, 4216 hold the shaft 4222 while surrounding the outer circumference of the shaft 4222, such that the tension portions can maintain the holding state with the shaft. In this holding state, the internal holder 422 and the external holder 421 may slide and then may be rotated altogether as an integral part.

According to various embodiments, the holder 420 may be unlocked by sliding in the direction further away from the battery body 410 by the first distance, and may allow at least one charging connector to be exposed through the opening by sliding in the direction further away from the battery body 410 by the second distance, and may allow at least one charging connector to be in the drawable state from a battery body 710 by being rotated after sliding by the second distance.

Figure 7A:
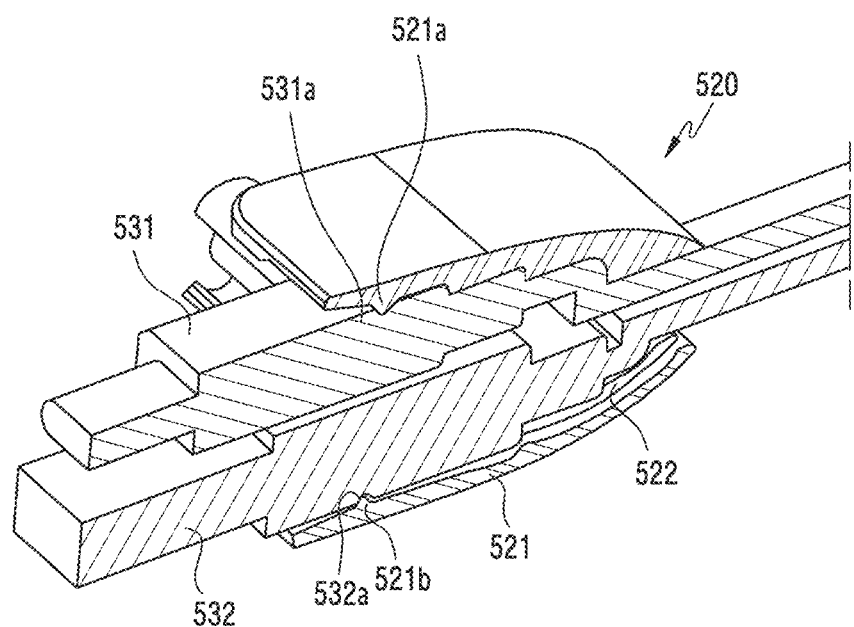
FIG. 7A is a partially cutaway perspective view illustrating first and second charging connectors coupled to an external holder according to various embodiments of the present disclosure.
Figure 7B:
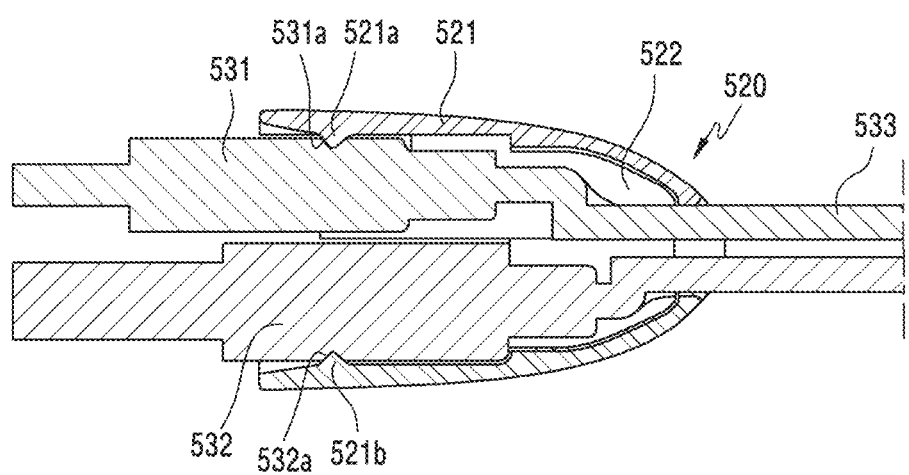
FIG. 7B is a cross-sectional view illustrating the first and second charging connectors coupled to the external holder according to various embodiments of the present disclosure.

FIG. 7A is a partially cutaway perspective view illustrating first and second charging connectors coupled to an external holder according to various embodiments of the present disclosure. FIG. 7B is a cross-sectional view illustrating the first and second charging connectors coupled to the external holder according to various embodiments of the present disclosure.

Referring to FIGS. 7A and 7B, a holder 520 of a sub battery according to various embodiments may have the same configuration as that of the holder 120 of the sub battery illustrated in FIGS. 1 to 3. According to various embodiments, the holder 520 may further include at least one coupling structure for fixing the first and second charging connectors 531, 532 to the external holder 521. For example, the holder 520 may further include a first coupling structure between the first charging connector 531 and the external holder 521, and may further include a second coupling structure between the second charging connector 532 and the external holder 521.

According to various embodiments, the first coupling structure may include a first coupling recess 531a formed on the first charging connector 531, and a first coupling protrusion 521a formed on a first portion of the external holder 521 to be inserted into the first coupling recess 531a and to fix the first charging connector 531 to the external holder 521. According to various embodiments, the second coupling structure may include a second coupling recess 532a formed on the second charging connector 532, and a second coupling protrusion 521b formed on a second portion of the external holder 521 to be inserted into the second coupling recess 532a and to fix the second charging connector 532 to the external holder 521. The first and second coupling recesses 531a, 532a are recessed toward each other, and the first and second coupling protrusions 521a, 521b may protrude toward each other.

To decouple the first charging connector 531 or the second charging connector 532 from the holder 520, the user may hold the holder 520, first, and slightly rotate the same in the clockwise direction or counterclockwise direction. Then, the coupling protrusion 521a, 521b may be subjected to a force in the direction of being released from the coupling recess, and the one charging connector may be released from the holder 520. The other charging connector may be subjected to a force in the direction of more pushing the coupling protrusion to the coupling recess, and thus may be fixed to the holder 520. Next, the charging connecter having the coupling protrusion released from the coupling recess may be easily drawn out from the holder 520. The other charging connector may have the coupling protrusion fixedly coupled to the coupling recess.

Figure 8:
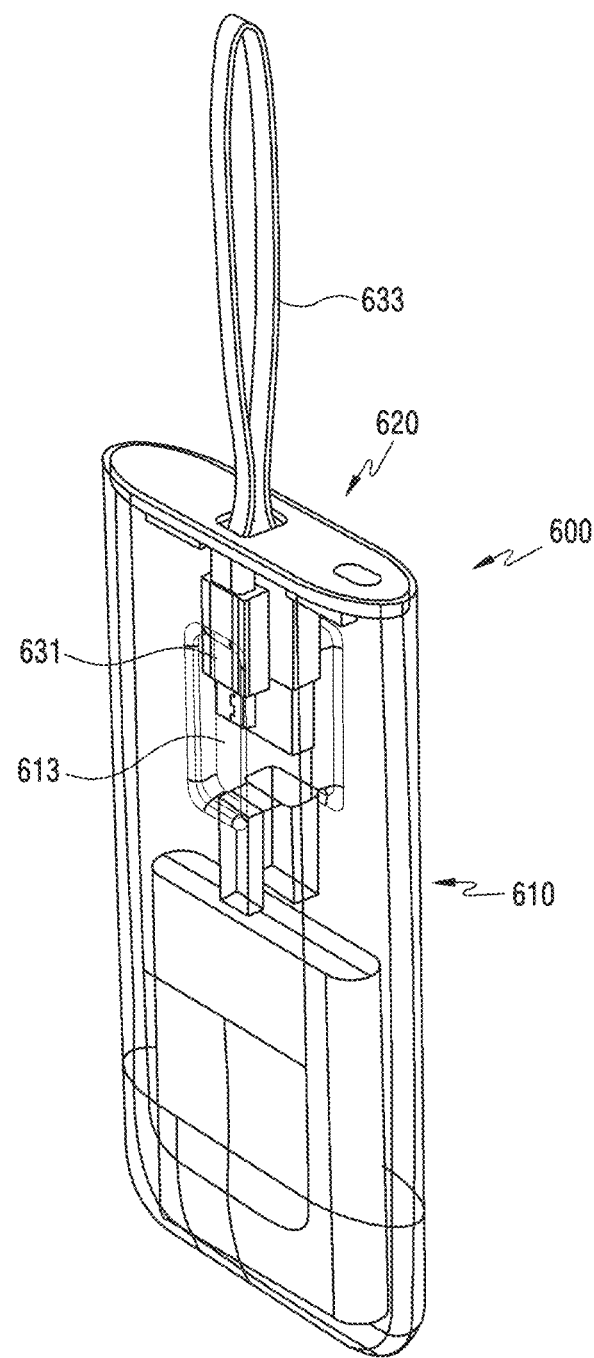
FIG. 8 is a perspective view illustrating a sub battery having a holder fixed to a battery body according to various other embodiments of the present disclosure.
Figure 9:
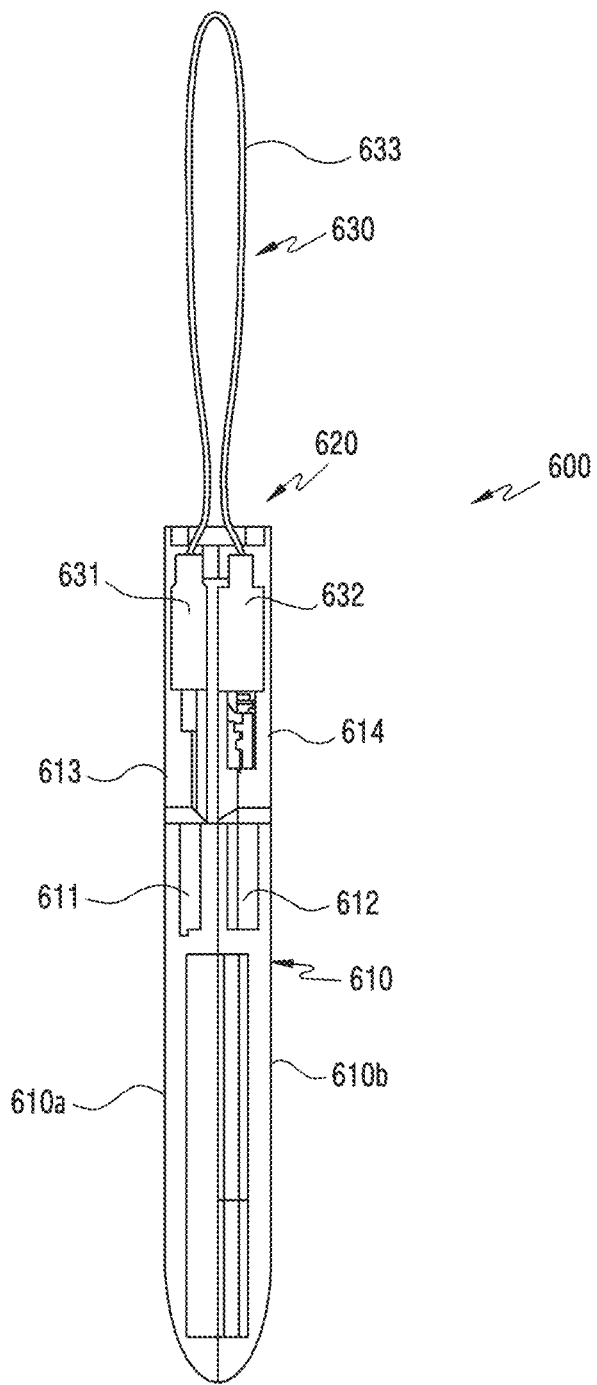
FIG. 9 is a cross-sectional view illustrating an internal configuration of the sub battery having the holder fixed to the battery body according to various other embodiments of the present disclosure.

FIG. 8 is a perspective view illustrating a sub battery having a holder fixed to a battery body according to various other embodiments of the present disclosure. FIG. 9 is a cross-sectional view illustrating an internal configuration of the sub battery having the holder fixed to the battery body according to various other embodiments of the present disclosure.

Referring to FIGS. 8 and 9, the sub battery 600 according to various other embodiments may include a battery body 610, a holder 620, and a charging connector cable 630. In the sub battery 100 illustrated in FIGS. 1 to 3, the holder 120 is configured to slid and rotate in the battery body 110. However, in the sub battery 600 illustrated in FIG. 8, the holder 620 may be configured to be fixed to the battery body 610. The charging connector cable 630 may have the same configuration as that of the charging connector cable 430 illustrated in FIG. 4.

According to various embodiments, the battery body 610 may include first and second connection portions 611, 612 for electrically connecting first and second charging connectors 631, 632 mounted in the holder 620 to the battery body 610. The first connection portion 611 may be an electric connection connector for connecting the first charging connector 631 to the battery body 610, and the second connection portion 612 may be an electric connection connector for connecting the second charging connector 632 to the battery body 610.

According to various embodiments, the battery body 610 may include a first surface 610a having a first opening 613 opened toward a first direction, and a second surface 610b having a second opening 614 opened toward a second direction opposite the first direction. In addition, the first and second openings 613, 614 may face each other. The first opening 613 may be a hole for drawing out the first charging connector 631 from the battery body 610, and the second opening 614 may be a hole for drawing out the second charging connector 632 from the battery body 610.

According to various embodiments, the holder 620 may be configured to be mountable in or dismountable from the battery body 610, and may be a support structure for supporting the charging connector cable 630. According to various embodiments, the holder 620 may have the first and second charging connectors 631, 632 attachable and detachably fixed to a support structure, and the charging connector cable 630 may be drawn out through a drawing-out opening of the holder, and may be used as a strap of the sub battery 600.

According to various embodiments, the sub battery 600 may have the first charging connector 631 connected to the first connection portion 611 through the first opening 613, and may have the second charging connector 632 connected to the second connection portion 612 through the second opening 614. When the user holds the battery body 610 and pulls the connection cable 633 drawn out from the holder 620, the connected first and second charging connectors 631, 632 may be disconnected from the first and second connection portions 611, 612, and may be seated on the support structure of the holder 620.

According to various embodiments, the sub battery 600 may charge a first device, for example, an electronic device by drawing out the first charging connector 631 from the battery body 610 through the first opening 613 and then connecting the first charging connector 631 to the electronic device, and by connecting the second charging connector 632 to the second connection portion 612. In addition, according to various embodiments, the sub battery 600 may be charged by a second device, for example, a power supply unit, by drawing out the second charging connector 632 from the battery body 610 through the second opening 614, and then connecting the second charging connector 632 to the power supply unit, and by connecting the first charging connector 631 to the first connection portion 611.

Figure 10A:
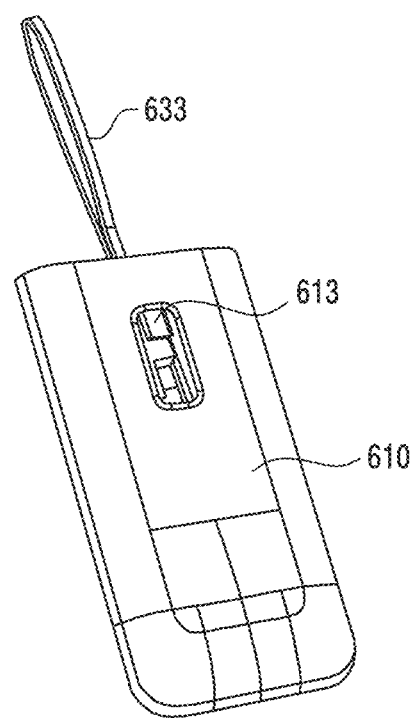
FIGS. 10A-10C are perspective views illustrating a process of drawing out a first charging connector from a battery body in phases according to various embodiments of the present disclosure, and specifically.
Figure 10B:
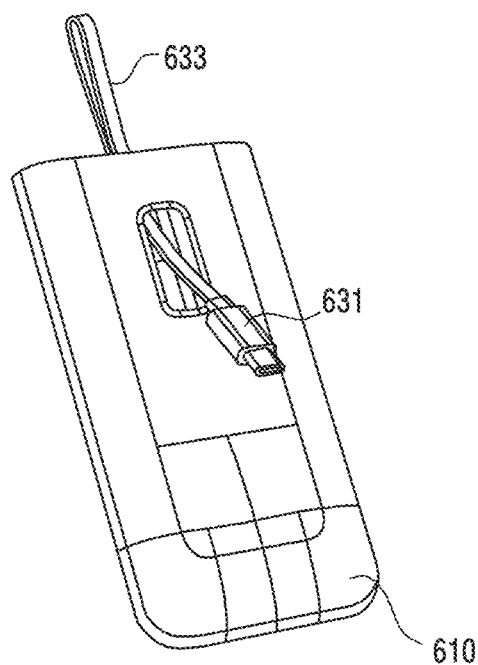
Figure 10C:
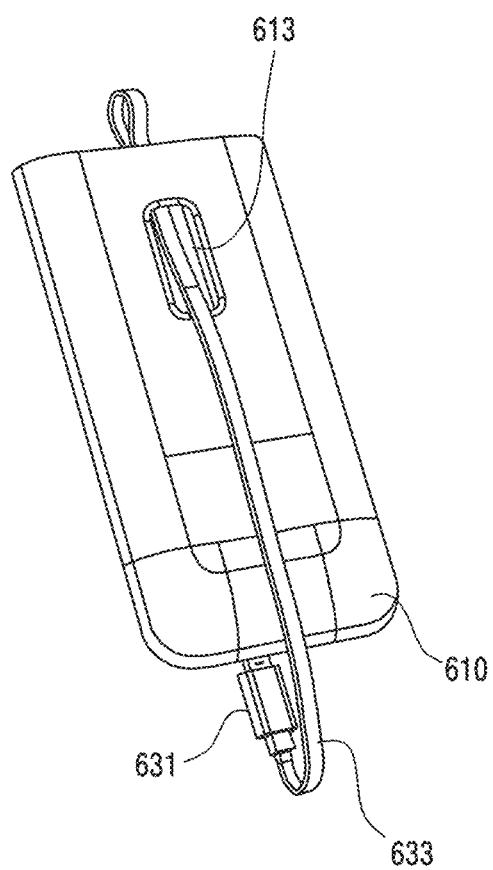

FIGS. 10A, 10B, and 10C are perspective views illustrating a process of drawing out a first charging connector from a battery body in phases according to various embodiments of the present disclosure, and specifically, FIG. 10A is a view illustrating the first and second charging connectors mounted in the holder, FIG. 10B is a view illustrating the first charging connector drawn out from the battery body, and FIG. 10C is a view illustrating the first charging connector drawn out from the battery body, before charging an electronic device (not shown).

Figure 11A:
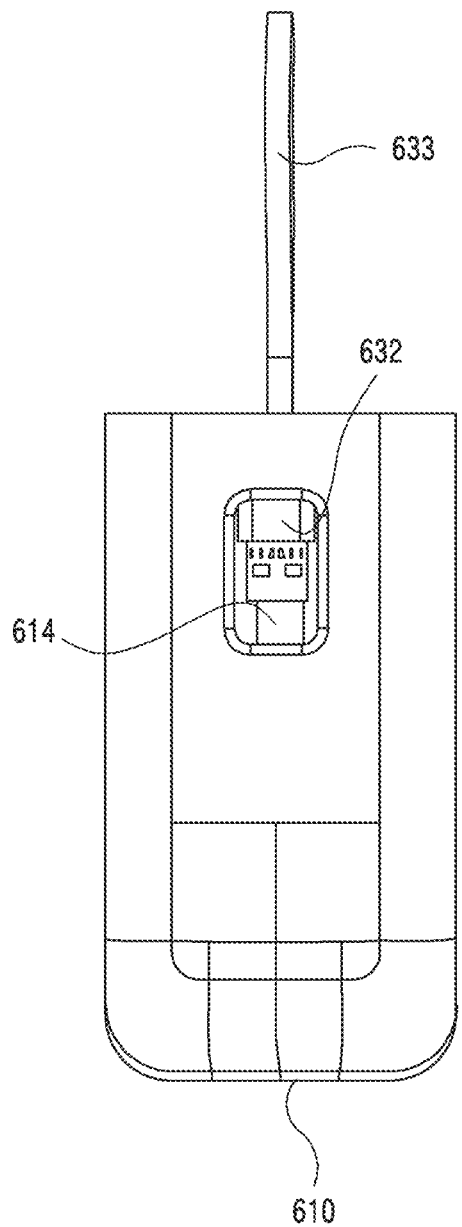
FIGS. 11A-11C are perspective views illustrating a process of connecting the second charging connector to the battery body in phases according to various embodiments of the present disclosure, and specifically.
Figure 11B:
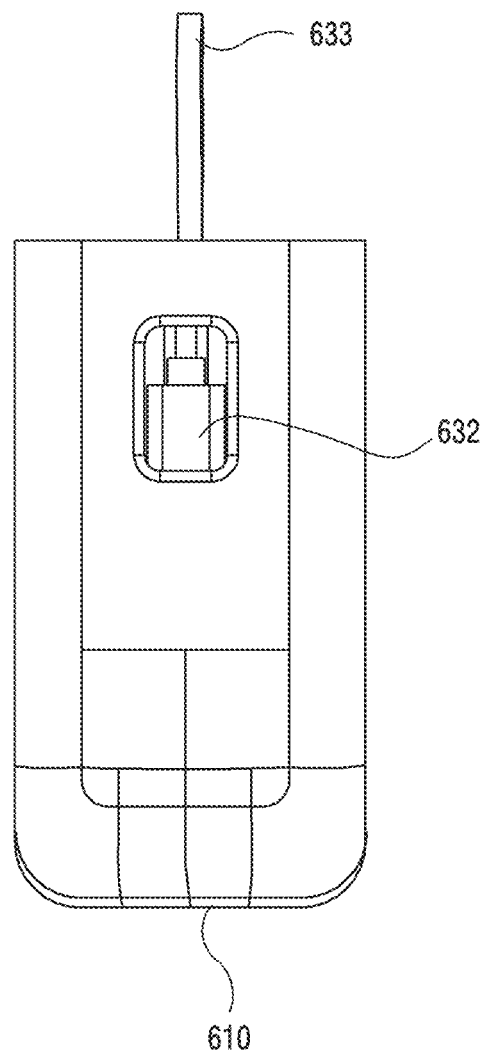
Figure 11C:
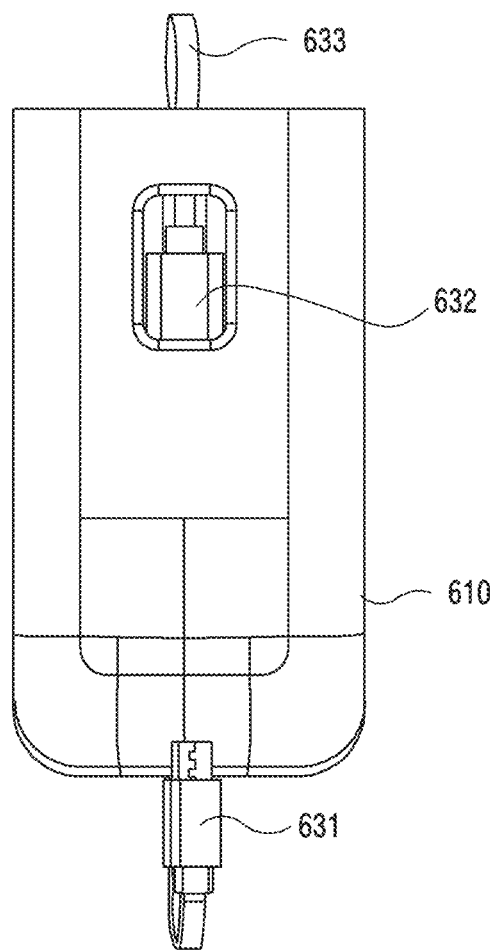

FIGS. 11A-11C are perspective views illustrating a process of connecting the second charging connector to the battery body in phases according to various embodiments of the present disclosure, and specifically, FIG. 11A is a view illustrating the first and second charging connectors mounted in the holder, FIG. 11B is a view illustrating the second charging connector connected to the battery body, and FIG. 11C is a view illustrating the second charging connector connected to the battery body and the first charging connector drawn out from the battery body.

Referring to FIGS. 10A-11C, the first charging connector 631 may be drawn out from the battery body 610, and the second charging connector 632 may be connected to the battery body 610. The first charging connector 631 may be drawn out from the battery body 610 through a first opening 613, and then may be connected to an electronic device, and the second charging connector 632 may be connected to a second connection portion, such that the electronic device can be charged.

Figure 12:
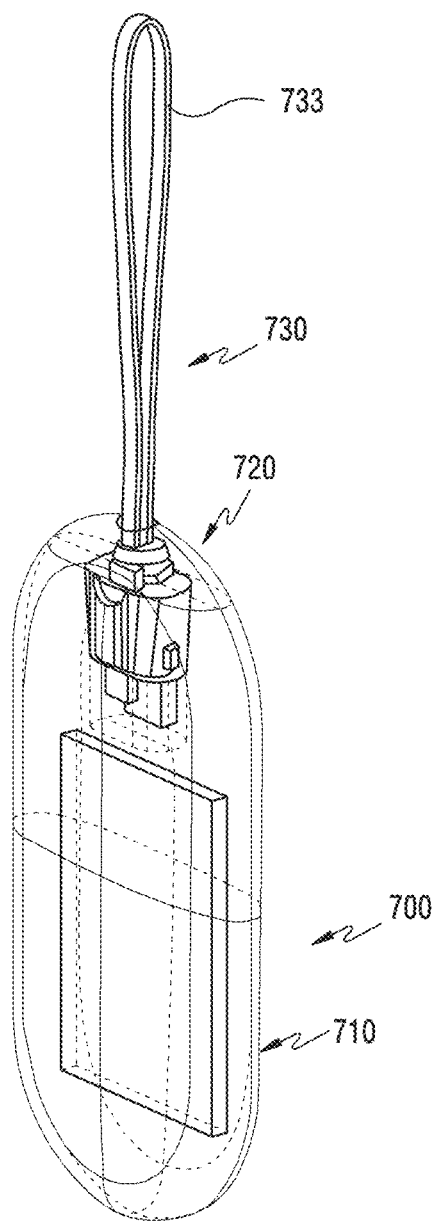
FIG. 12 is a perspective view illustrating a sub battery having a holder fixed to a battery body according to various other embodiments of the present disclosure.
Figure 13:
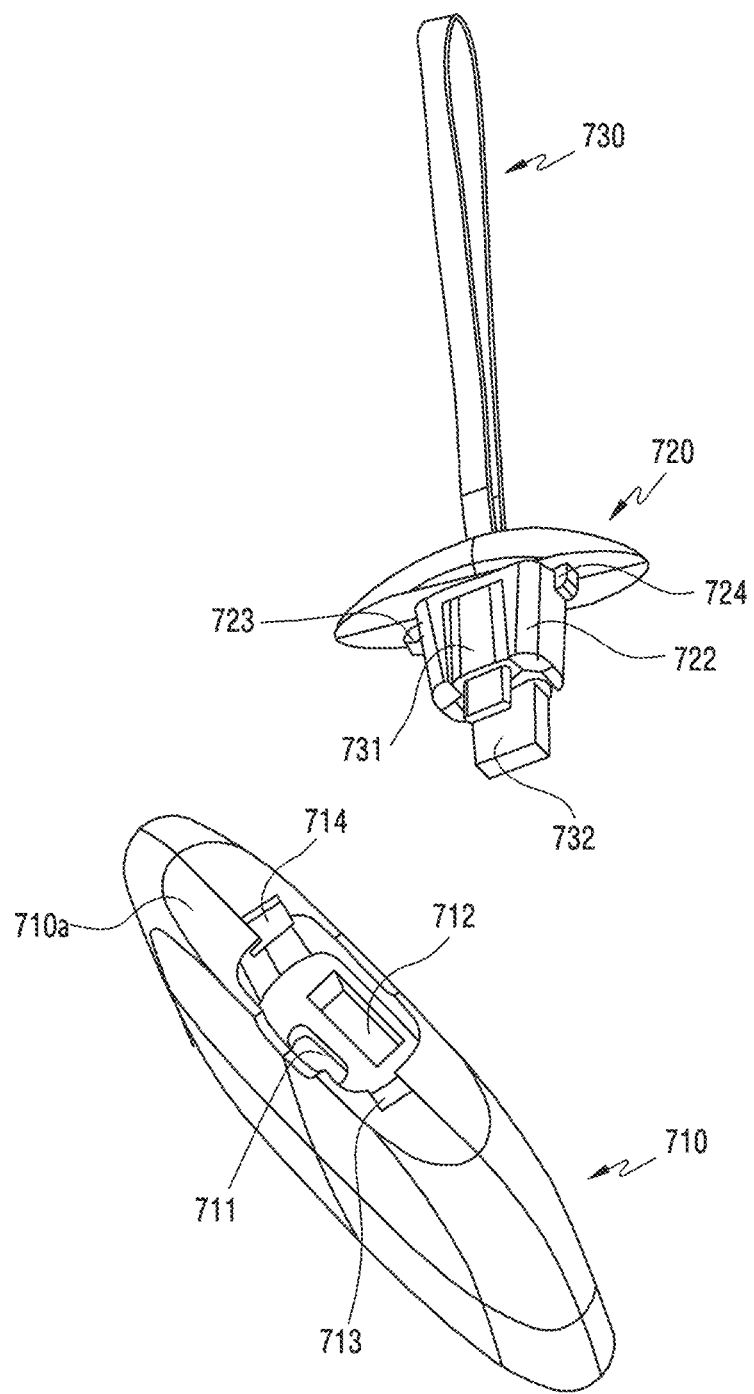
FIG. 13 is a perspective view illustrating the sub battery having the holder decoupled from the battery body according to various other embodiments of the present disclosure.

FIG. 12 is a perspective view illustrating a sub battery having a holder fixed to a battery body according to various other embodiments of the present disclosure. FIG. 13 is a perspective view illustrating the sub battery having the holder decoupled from the battery body according to various other embodiments of the present disclosure.

Referring to FIGS. 12 and 13, the sub battery 700 according to various embodiments may be configured to have a holder mounted in and dismounted from a battery body 710, while the holder 120 of the sub battery 100 illustrated in FIGS. 1 to 3 is configured to slid and to be rotated in the battery body 110. According to various embodiments, a charging connector cable 730 may have the same configuration as that of the charging connector cable 430 illustrated in FIG. 4.

Figure 14A:
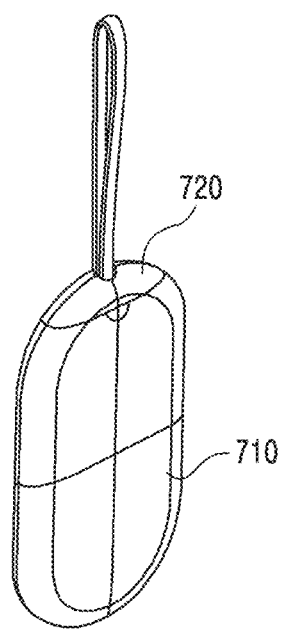
FIGS. 14A-14C are perspective views illustrating a process of attaching and detaching the holder to and from the battery body according to various other embodiments of the present disclosure.
Figure 14B:
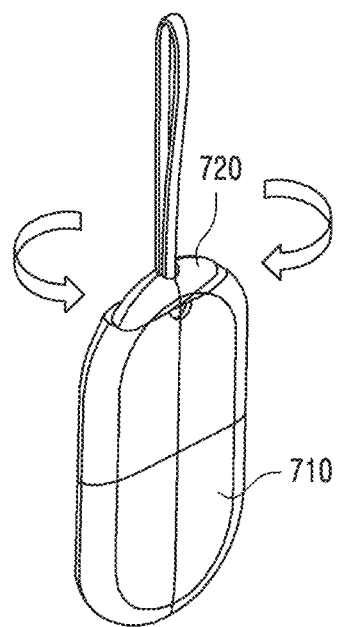
Figure 14C:
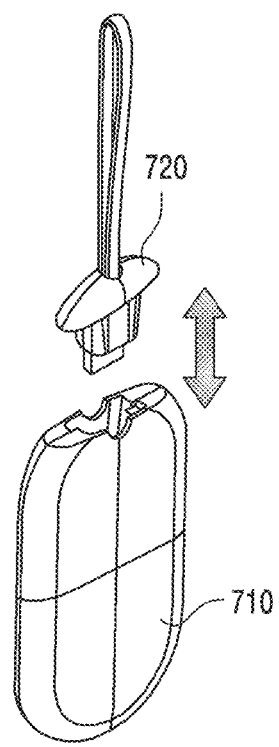

According to various embodiments, the holder 720 may be coupled to the battery body 710 by a mounting and dismounting structure as an integral body, or may be decoupled therefrom. The holder 720 may be decoupled from the battery body 710 after being rotated on the battery body 710 in the clockwise direction, and may be fixed to the battery body 710 by being slightly rotated on the battery body 710 in the counter clockwise direction. This mounting and dismounting operation of the holder 720 is illustrated in FIGS. 14A to 14C.

For example, the mounting and dismounting structure may include locking protrusions 723, 724 and locking recesses 713, 714. One pair of locking protrusions 723, 724 may be formed on a holding body 722 of the holder 720, and one pair of locking recesses 713, 714 may be formed on an upper end 710a of the battery body 710. The one pair of locking protrusions 723, 724 may be rotated in the one pair of locking recesses 713, 714 within a limit, thereby locking or unlocking the holder 720 to or from the battery body 710.

According to various embodiments, the battery body 710 may include first and second connection portions 711, 712 for electrically connecting first and second charging connectors 731, 732 mounted in the holder 720 to the battery body 710. The first connection portion 711 may be an electric connection connector for connecting the first charging connector 731 to the battery body 710, and the second connection portion 712 may be an electric connection connector for connecting the second charging connector 732 to the battery body 710.

According to various embodiments, the holder 720 may be configured to be mountable in and dismountable from the battery body 710, and may be a structure for supporting the charging connector cable 730. According to various embodiments, the holder 720 may be a structure for attachably and detachably fixing the first and second charging connectors 731, 732 to the holding body 722, and the charging connector cable 730 may be drawn out through a drawing-out opening of the holder 720 and may be used as a strap of the sub battery 700.

According to various embodiments, the sub battery 700 may have the first charging connector 731 connected to the first connection portion 711 through the opening of the battery body, and may have the second charging connector 732 connected to the second connection portion 712 through the opening of the battery body 710. When the user holds the battery body 710 and pulls the connection cable 733 drawn out from the holder 720, the connected first and second charging connectors 731, 732 may be disconnected from the first and second connection portions 711, 712, and may be seated on the support structure of the holder 720.

According to various embodiments, the sub battery 700 may charge a first device, for example, an electronic device, by decoupling the holder 720 through the opening, drawing out the first charging connector 731 from the holder 720, and then connecting the first charging connector 731 to the electronic device, and by drawing out the second charging connector 732 from the holder 720 and then connecting the second charging connector 732 to the second connection portion 712. According to various embodiments, the sub battery 700 may be charged by a second device, for example, a power supply unit (not shown), by drawing out the second charging connector 732 from the holder 720 through the opening, and then connecting the second charging connector 732 to the power supply unit, and by drawing out the first charging connector 731 from the holder 720 and then connecting the first charging connector 731 to the first connection portion 712.

According to various embodiments, the sub battery may manage a circuit of a charging unit according to a connection condition of a USB-C connector and a USB connector. That is, the sub battery may have three connection conditions of the USB-C connector and the USB connector.

The first condition is a condition where the USB-C connector and the USB connector are not in use and are closed when the sub battery is carried or stored. In this case, a current may be prevented from flowing to a connection terminal from an embedded battery.

The second condition is a condition where an electronic device is charged, and the USB-C connector is opened and the USB connector is closed. In this case, a voltage of an output terminal may be checked and the electronic device may be identified, and then charging may be started according to an appropriate voltage. However, a current may be prevented from flowing to a USB terminal.

The third condition is a condition where the sub battery is charged, and the USB-C connector is closed and the USB connector is opened. In this case, a voltage of a charger connected with the sub battery may be checked, and charging may be started.

By managing the three conditions of the connector, a current can be prevented from being consumed and wasted through a cable, and charging efficiency of the battery can be maximized.

Figure 15:
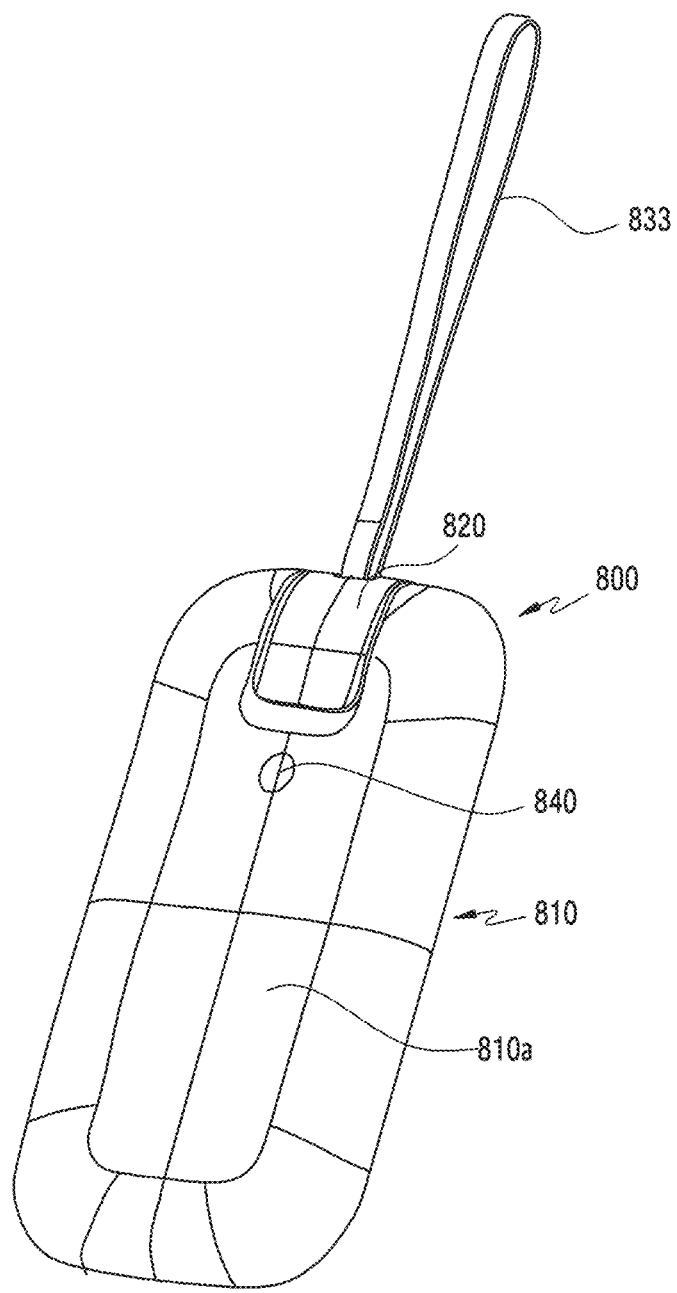
FIG. 15 is a perspective view illustrating an arrangement of a pressing button on a front surface of a battery body according to various embodiments of the present disclosure.

FIG. 15 is a perspective view illustrating an arrangement of a pressing button on a front surface of a battery body according to various embodiments of the present disclosure.

Referring to FIG. 15, a sub battery 800 according to various embodiments may be provided with a first pressing button 840 formed on a front surface 810*a* of a battery body 810, and may easily decouple a first charging connector (for example, 331 of FIG. 5A or 431 of FIG. 6A) from the battery body 810. For example, when the first pressing button 840 is pressed, the first charging connector may be pressed by the pressure of the first pressing button 840, and may be slightly moved toward a second charging connector (for example, 332 of FIG. 5A, 432 of FIG. 6A), and may be in a decouplable state. On the other hand, in response to the first pressing button 840 being pressed, the second charging connector may be more tightly coupled to an external holder.

In this state, the holder 820 may be moved by a user pulling the first charging connector and a strap 833, and then the first charging connector may be decoupled from the battery body 810. For example, the first pressing button 840 may serve to unlock the holder 820.

Figure 16:
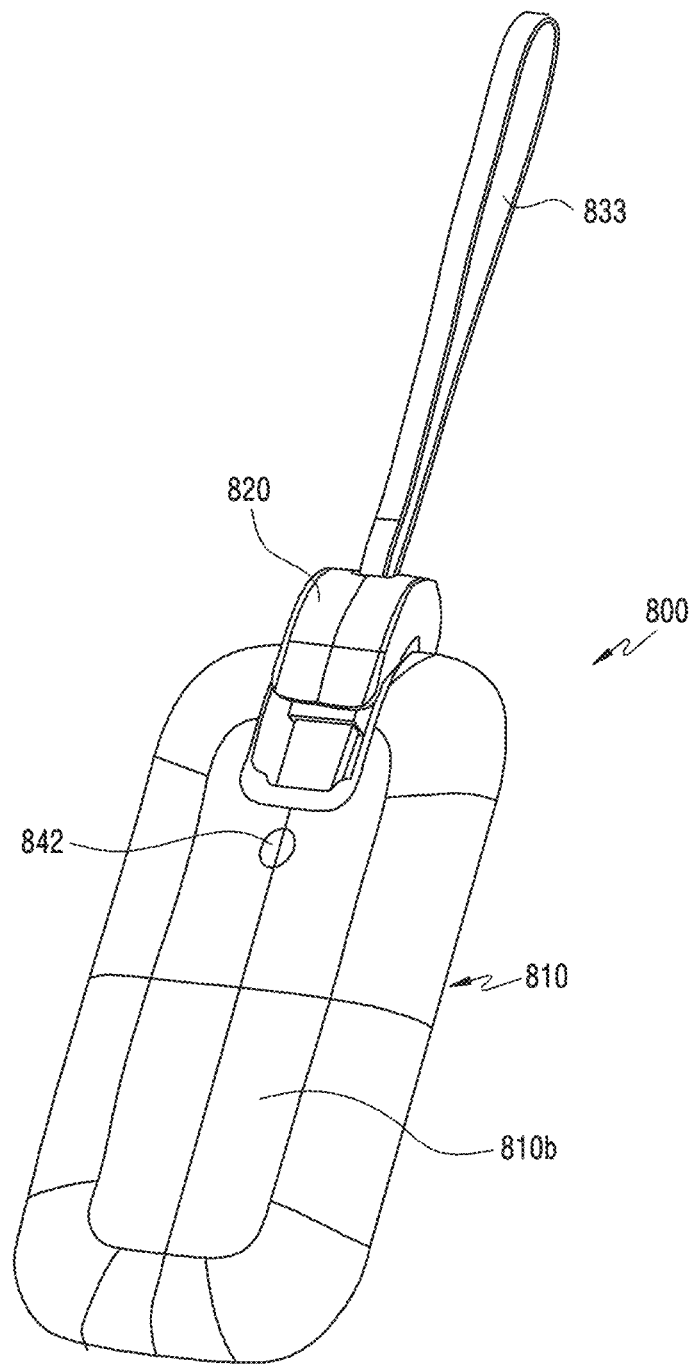
FIG. 16 is a perspective view illustrating an arrangement of a pressing button on a rear surface of the battery body according to various embodiments of the present disclosure.

FIG. 16 is a perspective view illustrating an arrangement of a pressing button on a rear surface of the battery body according to various embodiments of the present disclosure.

Referring to FIG. 16, the sub battery 800 according to various embodiments may be provided with a second pressing button 842 formed on a rear surface 810*b* of the battery body 810, and may easily decouple the second charging connector (for example, 332 of FIG. 5A or 432 of FIG. 6A) from the battery body 810. For example, when the second pressing button 842 is pressed, the second charging connector may be pressed by the pressure of the second pressing button, and may be slightly moved toward the first charging connector (for example, 331 of FIG. 5A, 431 of FIG. 6A), and the second charging connector and the holder 820 may be in a decouplable state. On the other hand, in response to the second pressing button 840 being pressed, the first charging connector may be more tightly coupled to the holder 820.

In this state, the second charging connector may be decoupled from the battery body 810 by the user pulling the second charging connector and the strap 833. For example, the second pressing button 842 may serve to unlock the holder 820.

The present disclosure has been described with reference to various example embodiments thereof. It will be understood by a person skilled in the art that the present disclosure can be implemented in modified forms without departing from the essential characteristics of the present disclosure. Therefore, disclosed embodiments should be considered from a descriptive perspective, not from a limited perspective. The scope of the present disclosure is defined not by the detailed description but by the appended claims, and all differences within the scope should be understood as being included in the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A sub battery comprising:
   a battery body comprising a first surface facing toward a first direction, a second surface facing toward a second direction opposite the first direction, and an opening formed on at least a portion between the first and second surfaces;
   a holder comprising a charging connector cable attachably and detachably fixed thereto and movably disposed in the opening; and
   a locking device mounted between the holder and the battery body and configured to fix the holder to the battery body in a closed state and to unlock the holder according to a movement of the holder by a first distance.

2. The sub battery of claim 1, wherein the holder comprises:
   an internal holder; and
   an external holder movably coupled to the internal holder while surrounding the internal holder and configured to slide the first distance in a direction further away from the battery body.

3. The sub battery of claim 2, wherein the locking device comprises:

a movable locker arranged in the battery body to be moved toward the external holder in the closed state and to couple the external holder to the battery body;

a tension portion formed on the external holder to provide a force for pushing the movable locker toward the external holder and coupling the external holder to the battery body; and a sliding guide rotation shaft formed in the internal holder and configured to be able to interlock with the tension portion to press the tension portion toward the movable locker and decouple from the tension portion according to the sliding of the external holder by the first distance to return the tension portion.

4. The sub battery of claim 3, wherein the external holder comprises a fixing recess configured to be coupled to a portion of the movable locker.

5. The sub battery of claim 3, wherein:

the tension portions are formed on both side surfaces of the external holder and comprise one pair of first and second tension protrusions facing each other, and the first and second tension protrusions are coupled to a portion of the sliding guide rotation shaft after the sliding of the external holder by the first distance.

6. The sub battery of claim 5, wherein the first and second tension protrusions each comprise a first and second coupling portion to hold an outer circumference of the sliding guide rotation shaft.

7. The sub battery of claim 2, wherein:

the external holder unlocks the holder by sliding on the internal holder the first distance in the direction further away from the battery body, the external holder exposes at least one charging connector through an opening by sliding a second distance in the direction further away from the battery body, and the at least one charging connector is drawable out from the battery body by rotating the external holder after the sliding by the second distance.

8. The sub battery of claim 2, wherein the charging connector cable comprises:

a first charging connector on one end to be coupled to the internal holder;

a second charging connector on the other end to be coupled to the internal holder and arranged to face the first charging connector; and a connection cable drawable from the internal holder to the outside and configured to electrically connect the first and second charging connectors.

9. The sub battery of claim 8, wherein the first charging connector comprises a USB-C connector and the second charging connector comprises a USB connector.

10. The sub battery of claim 8, further comprising an opening to allow the connection cable to be drawn out to the outside when the holder is closed in the opening.

11. The sub battery of claim 8, wherein:

a first device is charged by connecting the first charging connector drawn out from the battery body to the first device and connecting the second charging connector that is not drawn out to the battery body, and the battery body is charged by connecting the second charging connector drawn out from the battery body to a second device and connecting the first charging connector that is not drawn out to the battery body.

12. The sub battery of claim 2, further comprising:

a first coupling structure between a first charging connector and the external holder, and a second coupling structure between a second charging connector and the external holder.

13. The sub battery of claim 12, wherein:

the first coupling structure comprises:

a first coupling recess formed on the first charging connector; and a first coupling protrusion formed on a first portion of the external holder and configured to be inserted into the first coupling recess and fix the first charging connector to the external holder, and the second coupling structure comprises:

a second coupling recess formed on the second charging connector; and a second coupling protrusion formed on a second portion of the external holder and configured to be inserted into the second coupling recess and fix the second charging connector to the external holder.

14. The sub battery of claim 13, wherein the first and second coupling recesses are recessed toward each other and the first and second coupling protrusions protrude toward each other.

15. The sub battery of claim 2, wherein:

the internal holder comprises:

a first charging connector and a second charging connector arranged to face each other, and an opening to allow the charging connector cable to be drawn out from the holder the first charging connector and the second charging connector are configured to be attachable and detachable from each other.

16. The sub battery of claim 8, wherein a portion of the connection cable drawn out from the holder is utilized as a strap of the battery body.

\* \* \* \* \*